United States Patent [19]

Poggemiller et al.

[11] 4,353,423
[45] Oct. 12, 1982

[54] HYDRAULIC RESET FOR TILLAGE AND SEEDING EQUIPMENT

[75] Inventors: Erhard Poggemiller, Luseland; Ralph Sweet, Forgan, both of Canada

[73] Assignee: Kep Enterprises, Luseland, Canada

[21] Appl. No.: 25,399

[22] Filed: Mar. 30, 1979

Related U.S. Application Data

[63] Continuation-in-part of Ser. No. 835,049, Sep. 21, 1977, abandoned.

[51] Int. Cl.³ .................. A01B 61/04; A01B 63/32
[52] U.S. Cl. .................. 172/260.5; 172/572; 172/464; 111/85
[58] Field of Search .............. 172/261, 572, 264, 265, 172/464, 484, 491, 462, 260.5; 111/85, 87

[56] References Cited

U.S. PATENT DOCUMENTS

| | | | |
|---|---|---|---|
| 2,756,662 | 7/1956 | Christensen | 172/491 |
| 2,979,138 | 4/1961 | Martensen | 172/572 |
| 3,481,407 | 12/1969 | Arnold | 172/400 |
| 3,561,541 | 2/1971 | Woelfel | 172/265 |
| 3,706,345 | 12/1972 | Patterson | 172/572 |
| 3,749,035 | 7/1973 | Cayton | 172/484 |
| 3,752,092 | 8/1973 | Vinyard | 172/699 |
| 4,044,697 | 8/1977 | Swanson | 172/464 |
| 4,116,140 | 9/1978 | Anderson | 111/85 |
| 4,176,721 | 12/1979 | Poggemiller et al. | 172/572 |

Primary Examiner—Richard J. Johnson
Attorney, Agent, or Firm—Stanley G. Ade

[57] ABSTRACT

An hydraulic ram is situated between the tillage tool and the frame and is normally fully extended and acts as a rigid link. The ram has a predetermined and adjustable pressure so that if an obstruction is encountered by the tool, it only retracts when the preset pressure is exceeded and then returns to the fully extended position as soon as the obstruction is passed. It can be used on machines such as discers, hoe drills, press drills or any ground working implement which includes tillage tools which are pivoted to the frame and which do not engage the ground by raising and lowering the frame. An adjustable pressure reducing valve is situated in the hydraulic line extending to the ram and senses the pressure downstream of the valve rather than the pressure upstream as is usual.

4 Claims, 5 Drawing Figures

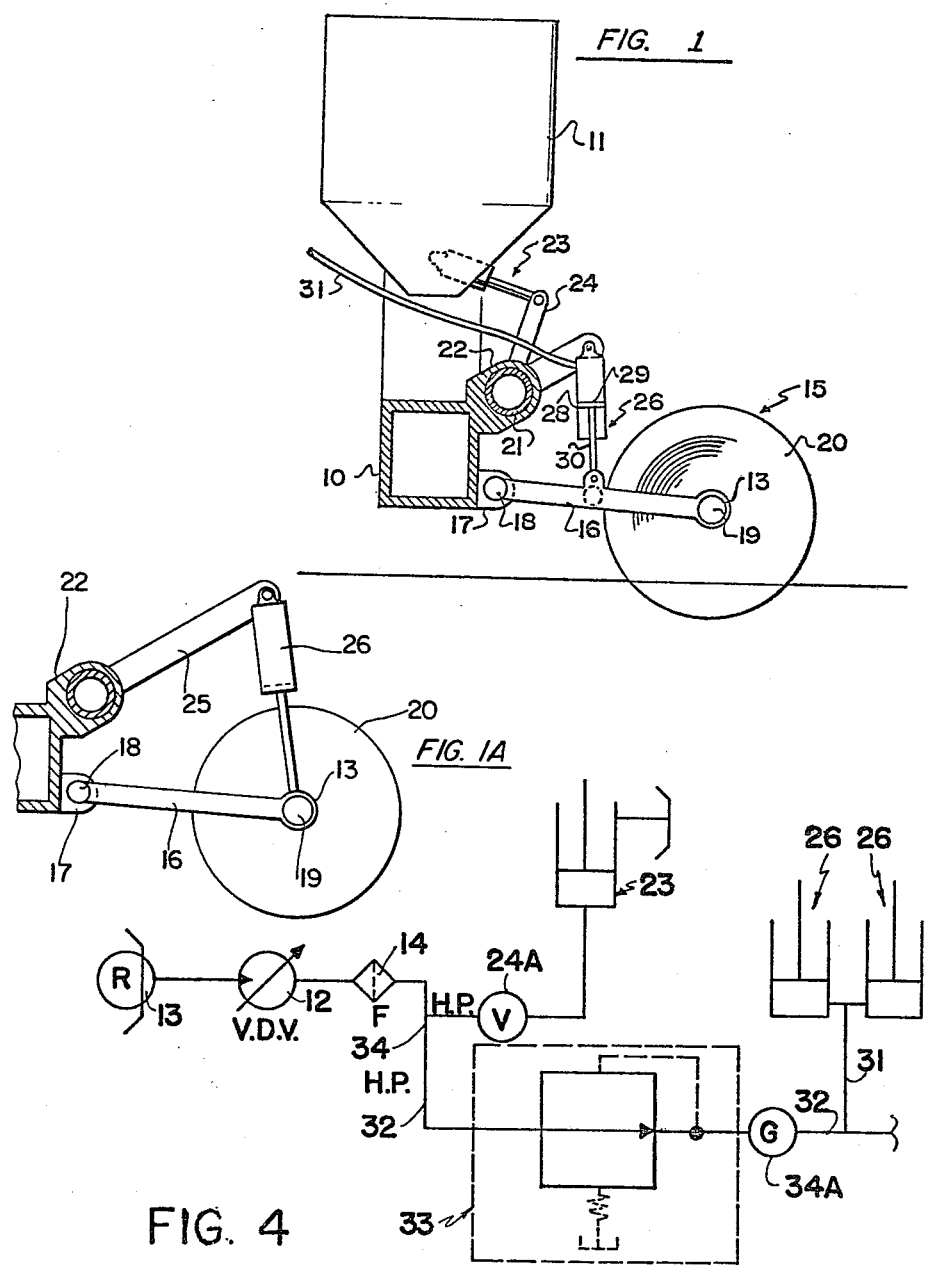

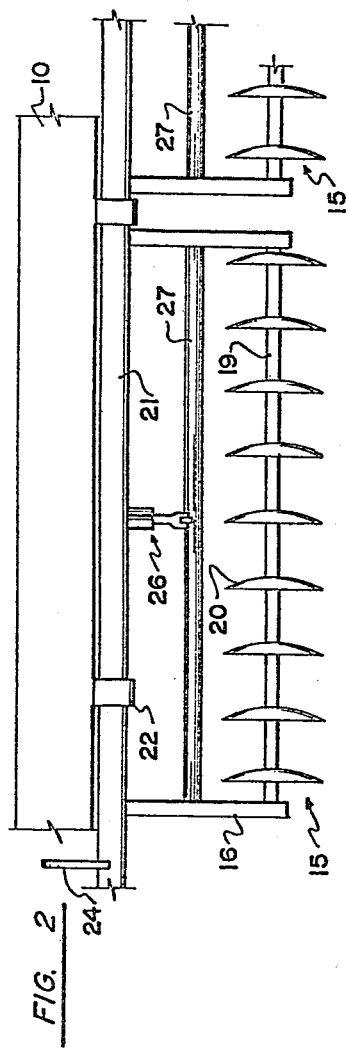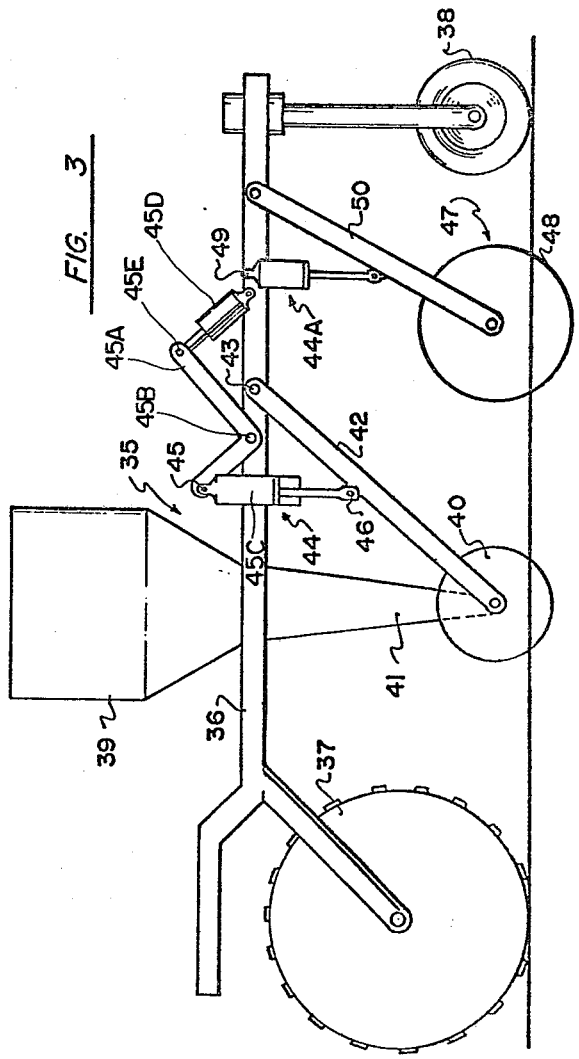

HYDRAULIC RESET FOR TILLAGE AND SEEDING EQUIPMENT

BACKGROUND OF THE INVENTION

This invention relates to new and useful improvements in resetting devices for agricultural implements, particularly discers, hoe drills, press drills or any ground working tool which has tilling tools engaged upon a pivot point which rotates relative to the frame and which does not engage the ground by raising or lowering the frame to the ground and constitutes a continuation-in-part application of U.S. application Ser. No. 835,049, filed Sept. 21, 1977 now abandoned.

Conventionally such machines have had adjustable tension applied to them by means of compression springs or the like and these springs allow for a reasonable amount of give on the compression, to trip over solid obstacles such as stones, rocks, roots or the like.

Unfortunately springs have very little resistance at the beginning of their travel and this resistance increases as the spring is extended or compressed.

Designs of tillage tools with springs, such as discers, usually have several gangs linked together rigidly and these are then put under tension by a spring. These tend to ridge the ground because of uneven soil densities and the inability of a spring to apply enough tension to penetrate relatively hard ground and yet have enough compression left so that they trip in case an obstacle is encountered. Furthermore, conventional designs incorporating springs, leaves untilled soil under straw rows because of the inability of the springs to provide sufficient penetration to penetrate through the straw rows and till the soil and again have enough movement left for tripping action in case of an obstacle being encountered.

This kind of action causes soil ridging and poor tillage as well as poor crop growth if the seed is put into the ground at an uneven depth. Under certain circumstances the seed will not grow at all if it is placed upon a straw row where the furrow openers haven't penetrated the soil.

Another disadvantage of conventional springs is that when travelling in field conditions at working speeds, the spring tends to bounce over an obstacle such as a rock and does not apply the same pressure at all times while passing over the obstacle. It will re-engage into the ground at a point some distance after the obstacle due to the time lag in spring extension and recoil and this leaves untilled soil. Furthermore, during a seeding operation it also tends to leave a relatively high weed count.

Attempts have been made to incorporate an hydraulic ram instead of springs and an example of this is shown in Arnold's U.S. Pat. No. 3,481,407. However, this disclosure teaches the use of conventional relief valve in the circuit which senses pressure upstream from the valve so that it must be set at a presure higher than the pump compensator setting so that the reset pressure cannot be controlled below this pump setting which normally is relatively high.

SUMMARY OF THE INVENTION

This invention overcomes these disadvantages by providing an hydraulic action inasmuch as a single acting hydraulic ram is used in place of a spring with means to control the pressure of the ram. An adjustable pressure reducing valve is incorporated so that the pressure acting upon ram is adjusted to a pressure below the setting of the main variable displacement pump (and the main setting ram) thus giving the desired control characteristics.

Under these circumstances, the ram operates at a completely extended position at all times unless an obstruction is reached. The pressure is adjusted by means of an adjustable valve in the pressure reducing valve, according to the soil density. With the preset pressure set according to soil density, all of the working tools or disc gangs would be at approximately the same depth thereby eliminating ridging and giving a relatively even seed bed. However, they still retain the full stroke of the ram for tripping action if an obstacle is engaged which causes an excess pressure on the ram above the preset pressure. When this action happens the same pressure is applied throughout the motion of tripping as the obstacle is passed and thus there is no time lag in expansion and recoil. As a result there are less misses due to the reset action of the ram thereby giving a lower weed count. This same action is also applied when working conditions require the tillage equipment to cut through straw rows.

One aspect of the invention is to provide, in an agricultural implement which includes a frame, and a ground engaging tool assembly pivotally supported upon said frame, an hydraulic system including a variable displacement pump, a high pressure line extending from said pump, a main hydraulic ram operatively connected to said high pressure line and to said ground engaging tool assembly for controlling and presetting the depth of penetration of said ground engaging tool assembly; the improvement comprising in combination a ground engaging tool assembly resetting ram assembly operatively extending between said ground engaging tool assembly and said frame, means operatively connecting said resetting ram assembly to the high pressure line of said hydraulic system and means to adjust the hydraulic pressure within said resetting ram assembly whereby said resetting ram assembly is normally fully extended until a predetermined pressure upon said ground engaging tool assembly is exceeded, said last mentioned means comprising an adjustable pressure reducing valve assembly operatively connected between said high pressure line and said resetting ram assembly to control and sense the pressure downstream of said valve assembly.

Another aspect of the invention is to provide a ground working agricultural implement comprising in combination a frame, a ground engaging tool assembly pivotally supported within said frame, an hydraulic system including a variable displacement pump, a high pressure line extending from said pump, a main hydraulic ram extending between said frame and said ground engaging tool assembly for controlling the depth of penetration of said ground engaging tool assembly, said main hydraulic ram being operatively connected to said high pressure line of said hydraulic system, at least one resetting ram assembly being operatively connected between said hydraulic ram and said ground engaging tool assembly and acting as a rigid link therebetween unless a predetermined pressure upon said resetting ram assembly is exceeded due to an obstruction encountered by said ground engaging tool assembly, and means to adjust the hydraulic pressure within said resetting ram assembly whereby said resetting ram assembly is normally fully extended until said predetermined pressure upon said ground engaging tool is exceeded, said last mentioned means comprising an adjustable pressure reducing valve assembly operatively connected between said high pressure line and said resetting assembly to control and sense the pressure downstream of said valve assembly.

With the foregoing in view, and other advantages as will become apparent to those skilled in the art to which this invention relates as this specification proceeds, the invention is herein described by feference to the accompanying drawings forming a part hereof, which includes a description of the preferred typical embodiment of the principles of the present invention, in which:

DESCRIPTION OF THE DRAWINGS

FIG. 1 is a partially schematic, partially sectioned end view of one embodiment of the invention as applied to a discer.

FIG. 1A is a partially schematic, partially sectioned view of FIG. 1 showing an alternative construction.

FIG. 2 is a fragmentary top plan view of one disc gang showing one method of securing the reset ram assembly and with the seed box removed for clarity.

FIG. 3 is a schematic side elevation showing the invention applied to a seed drill with an alternative structure showing the use of a no-till machine.

FIG. 4 is a schematic view of the hydraulic circuit.

In the drawings like characters of reference indicate corresponding parts in the different figures.

DETAILED DESCRIPTION

Proceeding therefore to describe the invention in detail, reference should first be made to FIGS. 1 and 2 in which reference character 10 illustrates the main frame of a discer having a seed box 11 supported thereon.

A main hydraulic system (shown in FIG. 4) includes a pump 12, a fluid tank or reservoir 13 and a filter 14. This portion of the hydraulic system is often carried on the tractor which is adapted to pull the implement. However, this is not illustrated in the accompanying drawings.

A plurality of disc gang assemblies collectively designated 15 are pivotally supported from the main frame 10 and in this embodiment, each disc gang is supported by a pair of members 16 pivoted by one end thereof to frame members 17 through pivots 18. These members extend rearwardly of the main frame 10 and include a spindle 19 journalled for rotation between members 16 and carrying a plurality of ground engaging discs 20 thereon, such structure being conventional.

A main rock shaft 21 is supported within pillow blocks 22 at the rear of the main frame 10 and a main hydraulic ram assembly 23 extends between the frame and a lug 24 connected to the rock shaft 21 so that extension and retraction of the main hydraulic ram rotates the rock shaft 21 within the pillow bearings or blocks 22.

The movement of the main hydraulic ram 23 is by means of a control valve 24A shown in the hydraulic circuit of FIG. 4.

For each disc gang, at least one link 25 is secured to the rock shaft 21 and extends therefrom and a resetting ram assembly 26 extends between the link 25 and is operatively connected by the other end thereof to the members 16 of each disc gang 15.

If desired, a pair of rams 26 may extend between links 25 and members 16 in either of the locations shown in FIGS. 1 or 1A, or, alternatively, a cross member 27 may extend between members 16 with a single resetting ram assembly 26 extending between link 25 and the center of member 27 as shown in FIG. 2.

Resetting rams 26 are single acting rams including a cylinder 28 having a piston 29 therein secured to a piston rod 30 which in turn extends to members 16 or 27 and an hydraulic hose 31 extends from the cylinder 28 to a main hydraulic line 32 (see FIG. 1). An adjustable pressure reducing valve 33 is situated in the line 34 from the pump 12 and is adjusted to supply fluid under pressure to line 32, said fluid under pressure being registered upon gauge 34A.

This maintains a predetermined pressure within the ram cylinders 26, which are in parallel, thus fully extending the rams so that they act as a rigid link between link 25 and members 16 or 27.

This pressure reducing valve includes an adjustment which permits the operating pressure of the fluid in lines 32 and 31 and rams 26, to be adjusted within limits, to any pressure up to the pressure developed by the pump 12 and preset in the high pressure lines 34 upstream of the valve 33 so that the rams can be set to trip at the desired pressure regardless of the pressure operating ram 23.

In operation, the depth of penetration of discs 20 is controlled by valve 24A which controls the operation of the main or master ram assembly 23 and the reduced and adjusted pressure in rams 26 extends these rams to the fullest extent so that they act substantially as rigid links.

If, however, an obstruction is encountered by any one of the gangs 15, pressure builds up within ram 26 and as soon as this pressure exceeds the pressure set by the regulating valve 33, the ram will unload thus allowing the particular gang to trip or elevate until the obstruction is passed whereupon the constant pressure in line 32 will return the ram 26 to its fullest extent thus resetting the discs 20 at the predetermined depth controlled by the master cylinder assembly 23.

This enables the full pressure developed by the pump 12 (for example, approximately 800 pounds per square inch) to be utilized to hold the gangs at the required depth, (for example in hard or stoney ground) and to operate any other hydraulic equipment, yet enables the resetting rams 26 to be set at any desired tripping pressure below this full pressure so that chance of damage to the gangs or supporting structure is substantially reduced.

FIG. 3 shows an alternative construction such as a seed drill collectively designated 35. It consists of a frame 36 supported upon packer wheels 37 at the rear thereof and front wheels 38 at the front thereof. A seed box 39 is mounted upon frame 36 and delivers seeds to a combination seed disc and furrow opener 40 via seed hose 41. The seed discs and furrow openers 40 are mounted upon one end of links or members 42 pivoted to the frame 36 as at 43.

A combination main depth setting ram and resetting assembly is shown and generally designated 44. It consists of a bell crank 45A pivoted to the frame 36 intermediate the ends of the bell crank as shown at 45B. Ram 45C which is a single acting ram, extends between one end of bell crank 45A as shown at 45 and a point 46 intermediate the ends of link or member 42. Ram 45D which is a double acting ram, extends between the other end 45E of the bell crank and the frame 36. Ram 45C is operatively connected to the pressure reducing valve 33 and is fully extended and acts as a rigid link in exactly the same way as ram 26 hereinbefore described. Ram 45D is operatively connected to the hydraulic circuit and acts as the main ram assembly for the setting of the penetration of the seed disc and furrow opener 40 in exactly the same way as ram 23 hereinbefore described.

Alternatively, a master cylinder (not illustrated) imilar to ram 23 may control the basic setting of the seed disc and furrow opener 40 with the resetting ram 44 extending between this master cylinder and the link or member 42 and operating in a manner similar to the resetting ram 26 hereinbefore described and by means of an adjustable pressure reducing valve assembly 33.

Also illustrated in FIG. 3 is a resetting ram assembly 44A operating a coulter attachment collectively designated 47 which is used on no-till machines in which the coulter blade 48 opens a furrow for the drill disc 40. The reset ram assembly 44A is pivoted to the frame 36 at point 49 and to the supporting member or link 50 and operates in a manner similar to ram 26 as hereinbefore described.

In conclusion, the adjustable reset ram assembly is readily adapted for use with a hoe drill, press drill, discer or any normally spring tensioned furrow opener such as a coulter blade used on a no-till seeder. It will eliminate or reduce ridging that is caused by conventional machines and gives a relatively even depth of tillage across the width of the machine due to better penetration.

It also provides a better seed bed for the placement of seed when using a discer and will give more accurate control of depth for placing the seeds when used on a seeding machine.

Better control of weeds is accomplished due to the better and more even penetration achieved by the entire machine.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention:

1. In an agricultural implement which includes a frame, and a ground engaging tool assembly pivotally supported upon said frame, an hydraulic system including a variable displacement pump, a high pressure line extending from said pump, a main hydraulic ram operatively connected to said high pressure line and to said ground engaging tool assembly for controlling and presetting the depth of penetration of said ground engaging tool assembly; the improvement comprising in combination a resetting ram assembly for said ground engaging tool assembly, operatively extending between said ground engaging tool assembly and said frame, means operatively connecting said resetting ram assembly to the hydraulic system and means to adjust the hydraulic pressure within said resetting ram assembly below pump pressure whereby said resetting ram assembly is normally fully extended until a predetermined pressure upon said ground engaging tool assembly is exceeded, said last mentioned means comprising a pressure reducing valve assembly operatively connected between said high pressure line and said resetting ram assembly to control and sense the pressure downstream of said valve assembly, said ground engaging tool assembly including at least one disc gang mounted for pivotal action to said frame, a rock shaft assembly mounted on said frame and operatively connected to said main hydraulic ram, said resetting ram assembly being operatively connected between said rock shaft and said disc gang.

2. The improvement according to claim 1 in which said disc gang includes a member pivoted by one end thereof to said frame, at least one ground engaging disc on the other end of said member, said resetting ram assembly being operatively connected between said member and said frame.

3. A ground working agricultural implement comprising in combination a frame, a ground engaging tool assembly pivotally supported within said frame, an hydraulic system including a variable displacement pump, a high pressure line extending from said pump, a main hydraulic ram extending between said frame and said ground engaging tool assembly for controlling the depth of penetration of said ground engaging tool assembly, said main hydraulic ram being operatively connected to said high pressure line of said hydraulic system, at least one resetting ram assembly being operatively connected between said main hydraulic ram and said ground engaging tool assembly and acting as a rigid link therebetween unless a predetermined pressure upon said ram assembly is exceeded due to an obstruction encountered by said ground engaging tool assembly, and means to adjust the hydraulic pressure within said resetting ram assembly below pump pressure whereby said resetting ram assembly is normally fully extended until said predetermined pressure is exceeded, said last mentioned means comprising an adjustable pressure reducing valve assembly operatively connected between said high pressure line and said resetting ram assembly to control and sense the pressure downstream of said valve assembly, said ground engaging tool assembly including at least one disc gang mounted for pivotal action to said frame, a rock shaft assembly mounted on said frame and operatively connected to said main hydraulic ram, said resetting ram assembly being operatively connected between said rock shaft and said disc gang.

4. The improvement according to claim 3 in which said disc gang includes a member pivoted by one end thereof to said frame, at least one ground engaging disc on the other end of said member, said resetting ram assembly being operatively connected between said member and said frame.

* * * * *